(12) United States Patent
Kang (10) Patent No.: US 8,725,931 B1
(45) Date of Patent: May 13, 2014

(54) SYSTEM AND METHOD FOR MANAGING THE EXECUTION OF MEMORY COMMANDS IN A SOLID-STATE MEMORY

(75) Inventor: Ho-Fan Kang, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 873 days.

(21) Appl. No.: 12/732,951

(22) Filed: Mar. 26, 2010

(51) Int. Cl.
*G06F 13/12* (2006.01)

(52) U.S. Cl.
USPC ............. 711/103; 711/118; 711/141; 710/52; 710/56

(58) Field of Classification Search
USPC ................... 711/103, 118, 141; 710/52, 56
See application file for complete search history.

(56) References Cited

U.S. PATENT DOCUMENTS

| | | | |
|---|---|---|---|
| 5,093,780 A | 3/1992 | Sunahara | |
| 5,123,094 A | 6/1992 | MacDougall | |
| 5,634,099 A | 5/1997 | Andrews et al. | |
| 6,088,740 A * | 7/2000 | Ghaffari et al. | 710/5 |
| 6,205,521 B1 | 3/2001 | Schumann | |
| 6,338,122 B1 | 1/2002 | Baumgartner et al. | |
| 6,475,062 B1 | 11/2002 | Kubota et al. | |
| 6,678,801 B1 | 1/2004 | Greim et al. | |
| 6,757,781 B2 | 6/2004 | Williams et al. | |
| 6,760,820 B2 | 7/2004 | Henson et al. | |
| 6,862,151 B2 | 3/2005 | Hoskins et al. | |
| 6,969,989 B1 | 11/2005 | Mei | |
| 7,082,494 B1 | 7/2006 | Thelin et al. | |
| 7,114,041 B2 | 9/2006 | Hammitt et al. | |
| 7,174,467 B1 | 2/2007 | Helms et al. | |
| 7,310,699 B2 | 12/2007 | Sinclair | |
| 7,313,641 B2 | 12/2007 | Koch et al. | |
| 7,315,917 B2 | 1/2008 | Bennett et al. | |
| 7,340,580 B2 | 3/2008 | Kinoshita | |
| 7,363,396 B2 | 4/2008 | Liu et al. | |
| 7,363,421 B2 | 4/2008 | Di Sena et al. | |
| 7,366,826 B2 | 4/2008 | Gorobets et al. | |
| 7,406,547 B2 | 7/2008 | Haines et al. | |
| 7,424,587 B2 | 9/2008 | Caulkins et al. | |
| 7,441,054 B2 | 10/2008 | Wu et al. | |
| 7,441,067 B2 | 10/2008 | Gorobets et al. | |
| 7,457,903 B2 | 11/2008 | Purdham et al. | |
| 7,487,286 B2 | 2/2009 | Nagano et al. | |
| 7,582,868 B2 | 9/2009 | Jiang et al. | |
| 7,831,783 B2 | 11/2010 | Pandit et al. | |
| 2001/0034809 A1 | 10/2001 | Ogawa | |

(Continued)

OTHER PUBLICATIONS

Hu et al., "Write Amplification Analysis in Flash-Based Solid State Drives", SYSTOR'09, Haifa, 2009, Zurich Research Laboratory,copyright 2009 IBM Corporation, downloaded on May 12, 2010 from https://www.research.ibm.com/haifa/conferences/systor2009/papers/2_2_2.pdf, 13 pages.

(Continued)

*Primary Examiner* — Jae Yu (57) ABSTRACT

Embodiments of the invention are directed to a storage subsystem comprising a non-volatile solid-state memory array and a controller. In one embodiment, the controller includes a system operation module configured to manage system memory operations and a queue configured to receive memory commands from a host system and the system operation module. The controller is configured to execute, in the memory array, memory commands from the queue in a sequence that is based at least in part on a throttling ratio provided by the system operation module.

15 Claims, 7 Drawing Sheets

(56) References Cited

U.S. PATENT DOCUMENTS

| | | |
|---|---|---|
| 2002/0040413 A1* | 4/2002 | Okada et al. .............. 710/68 |
| 2002/0083111 A1 | 6/2002 | Row et al. |
| 2004/0193743 A1 | 9/2004 | Byers et al. |
| 2005/0193081 A1 | 9/2005 | Gruber et al. |
| 2005/0204187 A1 | 9/2005 | Lee et al. |
| 2006/0155917 A1 | 7/2006 | Di Sena et al. |
| 2006/0161724 A1 | 7/2006 | Bennett et al. |
| 2007/0016721 A1 | 1/2007 | Gay |
| 2007/0033332 A1 | 2/2007 | Sinclair et al. |
| 2007/0043900 A1 | 2/2007 | Yun |
| 2007/0186032 A1 | 8/2007 | Sinclair et al. |
| 2007/0186065 A1 | 8/2007 | Lee et al. |
| 2008/0082736 A1 | 4/2008 | Chow et al. |
| 2008/0091872 A1 | 4/2008 | Bennett et al. |
| 2008/0126685 A1 | 5/2008 | Danilak |
| 2008/0126719 A1 | 5/2008 | Danilak |
| 2008/0126720 A1 | 5/2008 | Danilak |
| 2008/0126891 A1 | 5/2008 | Danilak |
| 2008/0155166 A1 | 6/2008 | James et al. |
| 2008/0235443 A1 | 9/2008 | Chow et al. |
| 2008/0263305 A1 | 10/2008 | Shu et al. |
| 2008/0282024 A1 | 11/2008 | Biswas et al. |
| 2008/0288717 A1 | 11/2008 | Torabi |
| 2008/0307164 A1 | 12/2008 | Sinclair |
| 2009/0012976 A1 | 1/2009 | Kang et al. |
| 2009/0017220 A1 | 1/2009 | Muller et al. |
| 2009/0070502 A1 | 3/2009 | Noha et al. |
| 2009/0116475 A1 | 5/2009 | Krzyzanowski et al. |
| 2009/0129163 A1 | 5/2009 | Danilak |
| 2009/0150599 A1 | 6/2009 | Bennett |
| 2009/0154026 A1 | 6/2009 | Jiang et al. |
| 2009/0172250 A1 | 7/2009 | Allen et al. |
| 2009/0172258 A1 | 7/2009 | Olbrich et al. |
| 2009/0172260 A1 | 7/2009 | Olbrich et al. |
| 2009/0271562 A1 | 10/2009 | Sinclair |
| 2009/0313501 A1 | 12/2009 | Hallivuori |
| 2010/0023672 A1 | 1/2010 | Gorobets et al. |
| 2010/0037009 A1 | 2/2010 | Yano et al. |
| 2010/0185806 A1 | 7/2010 | Pruthi et al. |
| 2010/0262760 A1 | 10/2010 | Swing et al. |
| 2011/0022778 A1 | 1/2011 | Schibilla et al. |
| 2011/0055455 A1* | 3/2011 | Post et al. .............. 711/103 |
| 2011/0055458 A1 | 3/2011 | Kuehne |
| 2011/0191566 A1 | 8/2011 | Takamiya et al. |
| 2011/0231624 A1 | 9/2011 | Fukutomi et al. |
| 2012/0239851 A1 | 9/2012 | Calvert et al. |
| 2013/0024595 A1* | 1/2013 | Subramaniyan et al. ..... 710/308 |

OTHER PUBLICATIONS

Taratorin, Alexander M. and Klaas B. Klassen, Observation of Recording Pole Instability in Perpendicular Recording, IEEE Transaction on Magnetics, vol. 42, No. 10, Oct. 2006, pp. 2267-2269.

Webpage for Anandtech, located at www.anandtech.com, accessed on Jun. 17, 2011.

Notice of Allowance dated Apr. 2, 2013 issued in U.S. Appl. No. 12/777,771, 8 pages.

* cited by examiner

| PERCENT INVALID | PERCENT VALID | THROTTLING RATIO |
|---|---|---|
| 25 | 75 | 3 GC CMD : 1 HOST CMD |
| 50 | 50 | 1 GC CMD : 1 HOST CMD |
| 75 | 25 | 1 GC CMD : 3 HOST CMD |
| 100 | 0 | HOST CMD ONLY |

SYSTEM AND METHOD FOR MANAGING THE EXECUTION OF MEMORY COMMANDS IN A SOLID-STATE MEMORY

BACKGROUND

Solid-state storage subsystems execute many commands in the course of their normal operation. For example, garbage collection is frequently performed on memory blocks that may contain both valid and invalid data. When such a memory block is selected for garbage collection, the garbage collection operation copies valid data within the memory block to a new location in memory and then erases the entire memory block, making the entire block available for future data writes. In addition to garbage collection operations, solid-state storage subsystems also perform read and write operations as dictated by memory commands issued by host systems.

BRIEF DESCRIPTION OF THE DRAWINGS

Systems and methods which embody the various features of the invention will now be described with reference to the following drawings, in which.

DETAILED DESCRIPTION OF THE PREFERRED EMBODIMENTS

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Solid-state storage subsystems perform internal system operations such as garbage collection and wear leveling to improve performance and longevity. Embodiments of the invention are directed to managing the execution of commands related to these internal system operations and commands received from host systems.

One challenge of executing internal system commands (e.g. garbage collection commands) with host system commands is the ability to maintain a consistent execution throughput of host system commands, and in particular, host write commands. For example, if garbage collection commands do not free up blocks fast enough to keep up with host write commands, the storage subsystem may eventually run out of free blocks for additional host write commands. Once this occurs, storage subsystem performance is dramatically degraded as host write commands are stalled until the necessary garbage collection commands are executed to free up more blocks for writing.

One method to prevent stalling is to simply execute N garbage collection commands for every host command, whereby N is the worst case write amplification of the storage subsystem. The worst case write amplification is based at least in part on the amount of over provisioning (additional storage capacity) in the storage subsystem, and reflects the theoretical upper limit of the number of garbage collection commands required as a result of a write operation that necessitates a garbage collection operation. For example, a worst case write amplification of four means that at worst four garbage collection commands are needed per one host write command. In such an example, the controller of the storage subsystem system may prevent stalling by simply executing four garbage collection commands for every host write command. However, to always execute a number of garbage collection commands based on the worst case write amplification unnecessarily reduces the execution throughput of host commands, because in practice not every block undergoing garbage collection reaches the worst case write amplification.

In one embodiment of the invention, a garbage collection module determines a throttling ratio based on the number of pages containing invalid data within a current block undergoing garbage collection, and the throttling ratio is used by a controller to determine the number of garbage collection commands executed per a host system command at a particular point in time. Because the throttling ratio is dynamically determined based on the amount of invalid data within the current block undergoing garbage collection, the controller can optimize the execution ratio of garbage collection and host system commands while preventing stalled execution of host system commands.

System Overview

Figure 1A:
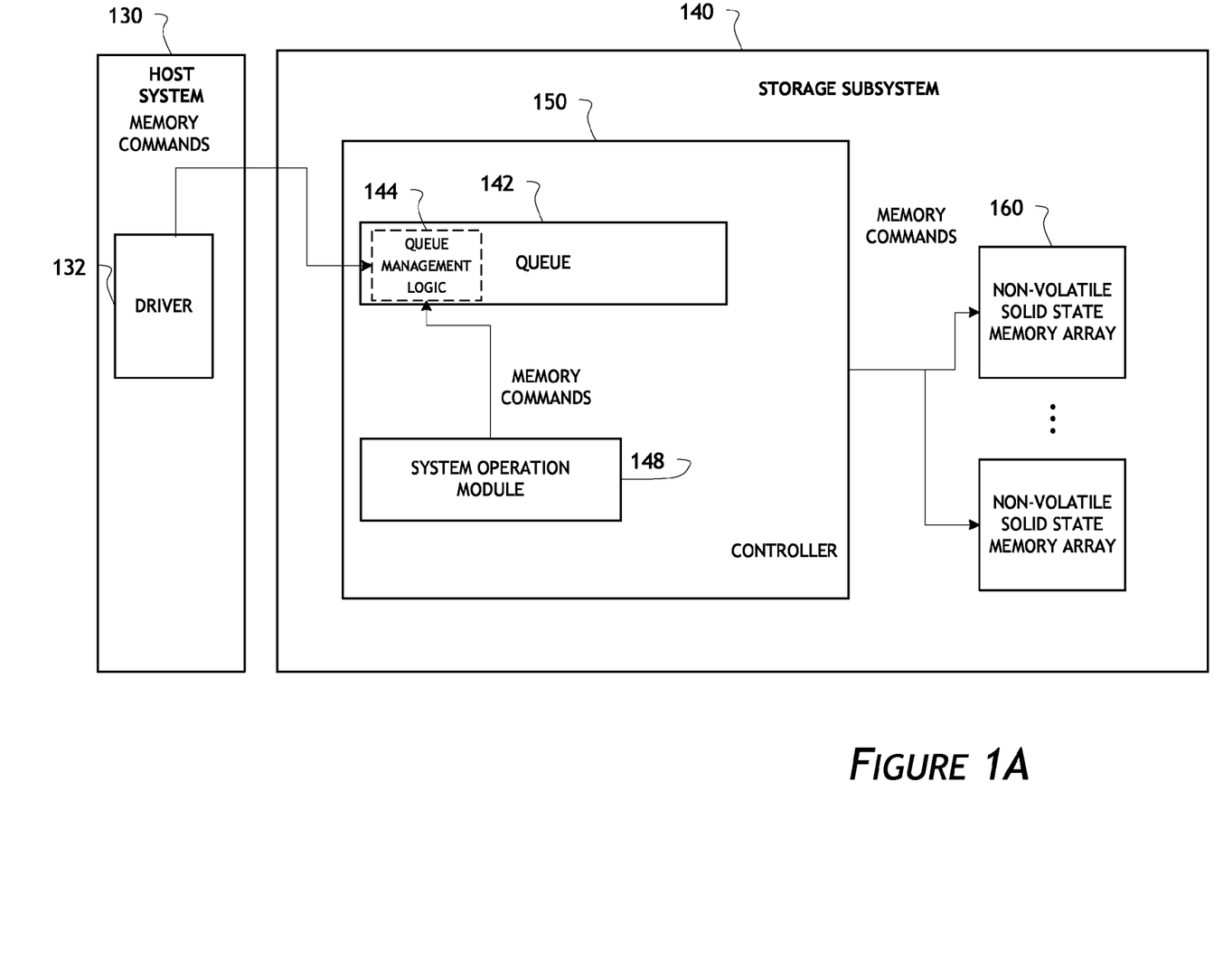
FIG. 1A is a block diagram illustrating a storage subsystem according to one embodiment.

FIG. 1A is a block diagram illustrating a storage subsystem embodiment. As shown, a storage subsystem 140 includes a controller 150, which in turn includes a queue 142 and a system operation module 148. In one embodiment, the queue 142 is implemented as a first-in-first-out (FIFO) data structure. In one embodiment, the queue 142 receives memory commands from a driver 132 residing within a host system 130 and from the system operation module 148. The memory commands from the driver 132 may include write and read commands issued by the host system, while memory commands from the system operation module 148 may include memory commands used to perform data maintenance and internal system operations such as garbage collection and wear leveling.

In one embodiment, the queue 142 includes queue management logic 144 to manage the flow of commands from the driver 132 and/or the system operation module 148. In other embodiments, the queue management logic may reside within the system operation module 148 and/or the driver 132, or the controller 150 may perform the functions of queue management without the dedicated queue management logic 144. The queue management logic is configured to manage the flow of the commands into and/or out of the queue so that they are executed in an optimized manner as further described herein while maintaining data integrity by preserving the order in which commands are issued by the host driver 132. As further shown in FIG. 1A, in one embodiment, the controller 150 executes the commands in the queue 142 in one or more non-volatile solid-state memory arrays 160.

Figure 1B:
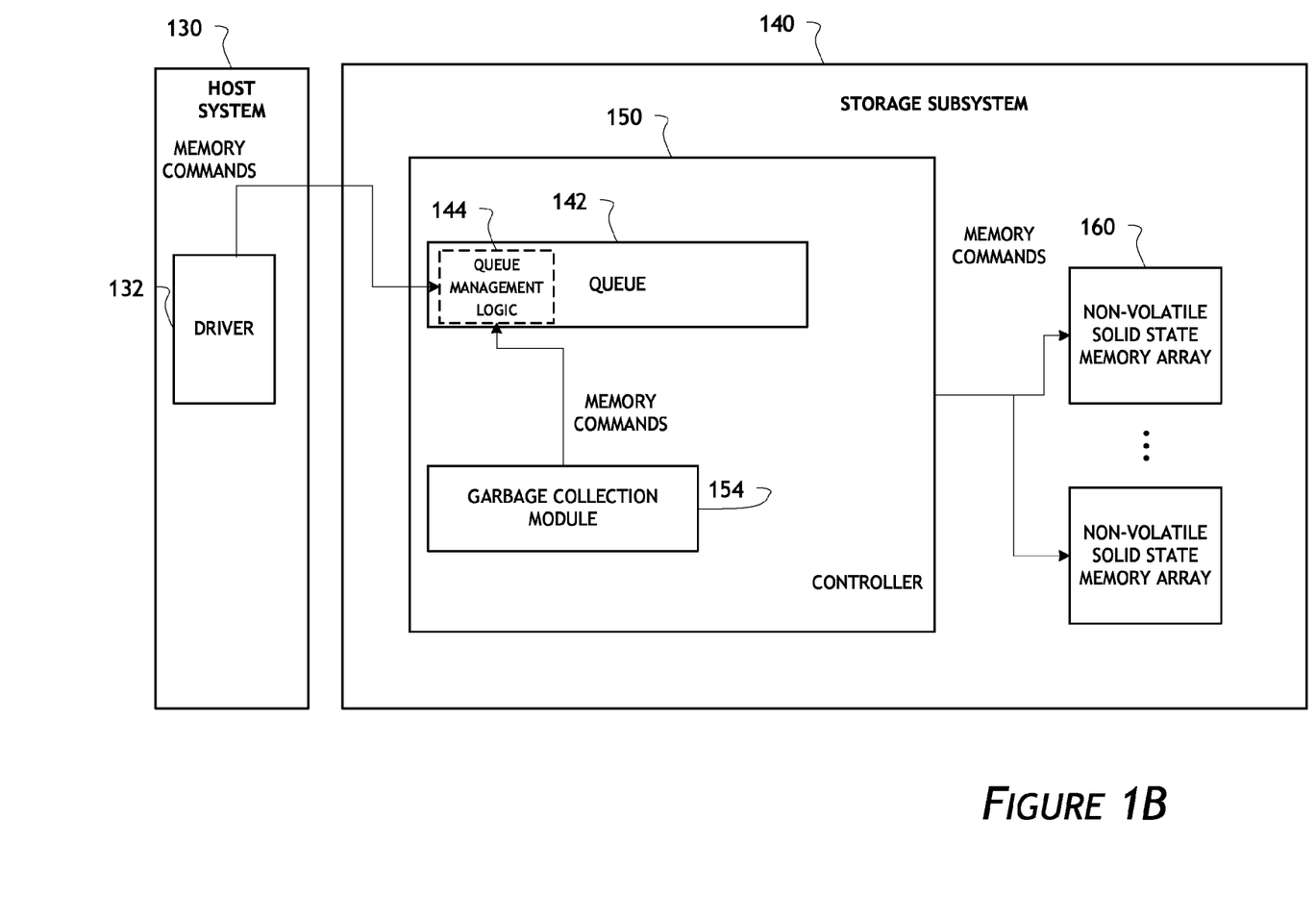
FIG. 1B is a block diagram illustrating a storage subsystem according to another embodiment.

FIG. 1B is a block diagram illustrating a storage subsystem according to another embodiment. The controller 150 is shown as including a garbage collection module 154, which issues garbage collection commands to the queue 142. The configuration and operation of other components shown in FIG. 1B remain substantially the same as those shown in FIG. 1A.

Figure 2:
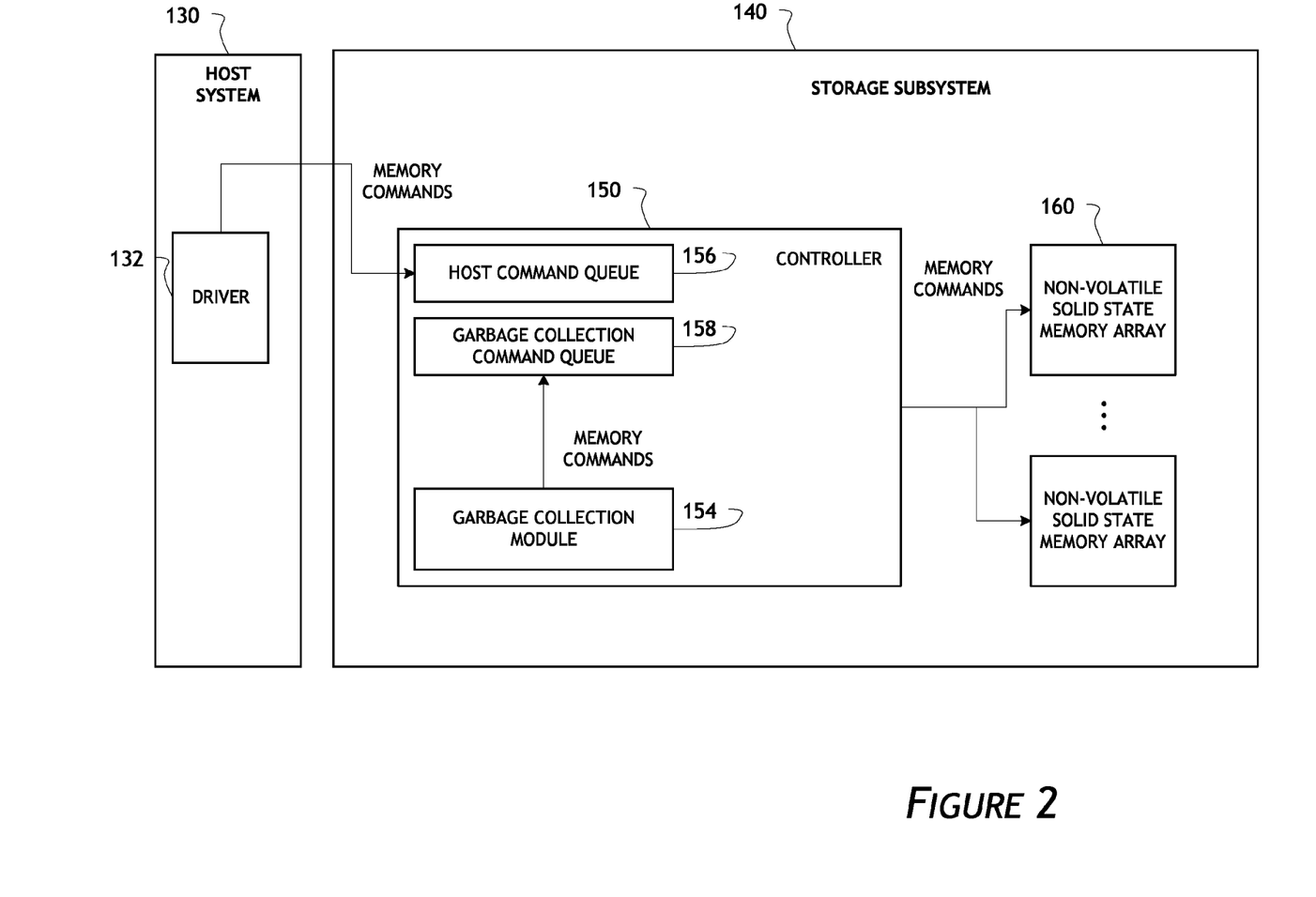
FIG. 2 is a block diagram illustrating a storage subsystem according to yet another embodiment.

FIG. 2 is a block diagram illustrating a storage subsystem according to yet another embodiment. In this embodiment, the controller 150 of the storage subsystem 140 includes a host command queue 156 for receiving commands from the driver 132 and a garbage collection command queue 158 for receiving commands from the garbage collection module 154. In one embodiment, the queues 156 and 158 are implemented as FIFO data structures. The controller 150 manages the execution of commands in the two queues 156 and 158 in order to optimize speed and maintain data integrity, as further described below. The configuration and operation of other components shown in FIG. 2 remain substantially the same as those shown in FIG. 1A.

Using a Throttling Ratio to Manage Commands

Figure 3:
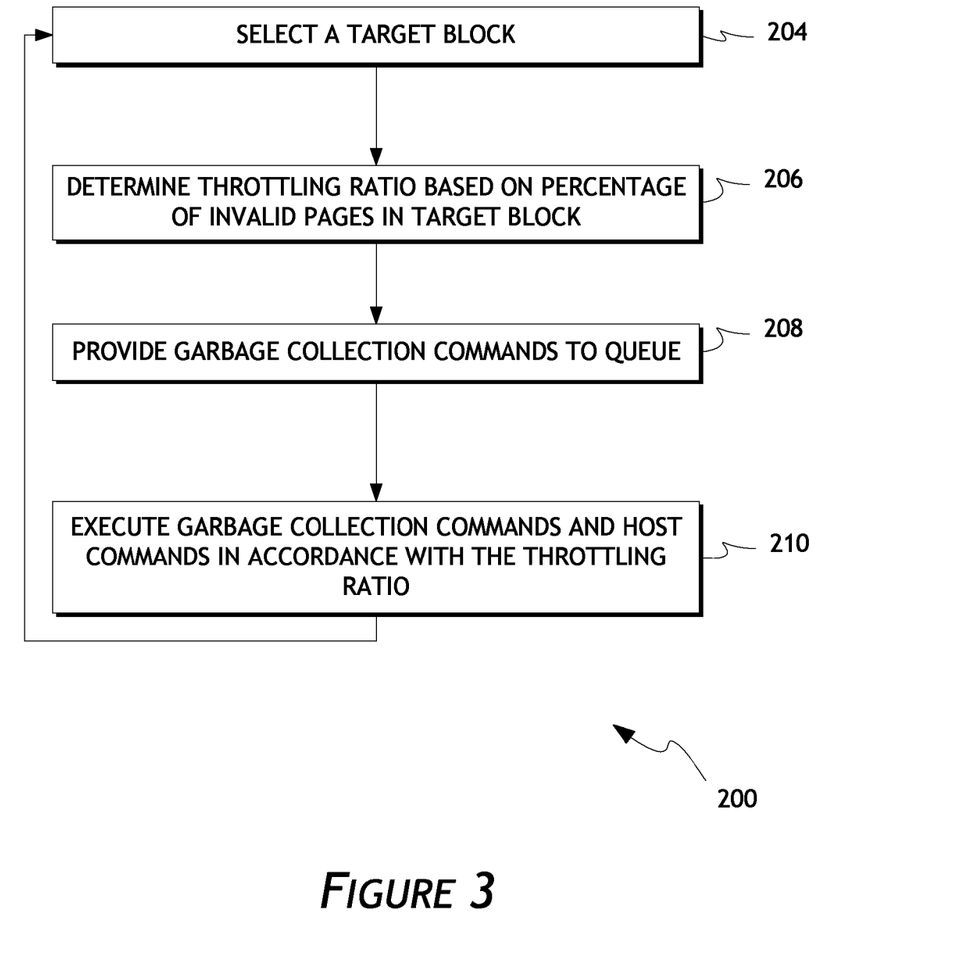
FIG. 3 is a flow diagram illustrating a method for managing memory commands in a solid-state storage subsystem according to one embodiment.

FIG. 3 is a flow diagram illustrating a method 200 for managing memory commands in a solid-state storage subsystem according to one embodiment. In block 204, the method begins by selecting a target block for garbage collection. In block 206, the method determines a throttling ratio. In one embodiment, the throttling ratio is determined based on a percentage of invalid pages in the selected target block. In block 208, the method provides commands associated with the garbage collection of the target block to a queue within the controller. For example, if the target block has 30 pages of valid data that need to be preserved, the method may issue 30 sets of garbage collection commands, each set including a read and a write command, to copy the 30 pages of valid data to new locations in memory. In block 210, the method executes garbage collection and host commands in the queue(s) in accordance with the throttling ratio determined in block 206.

Figure 4A:
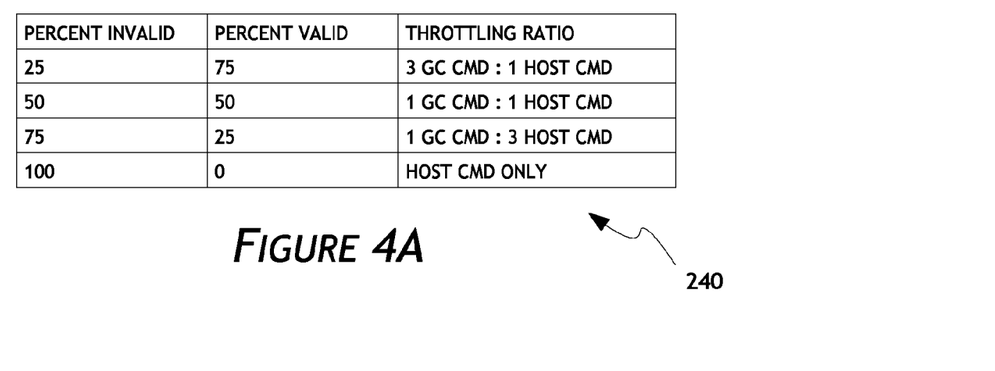
FIGS. 4A and 4B illustrate examples of managing memory commands according to one embodiment.
Figure 4B:
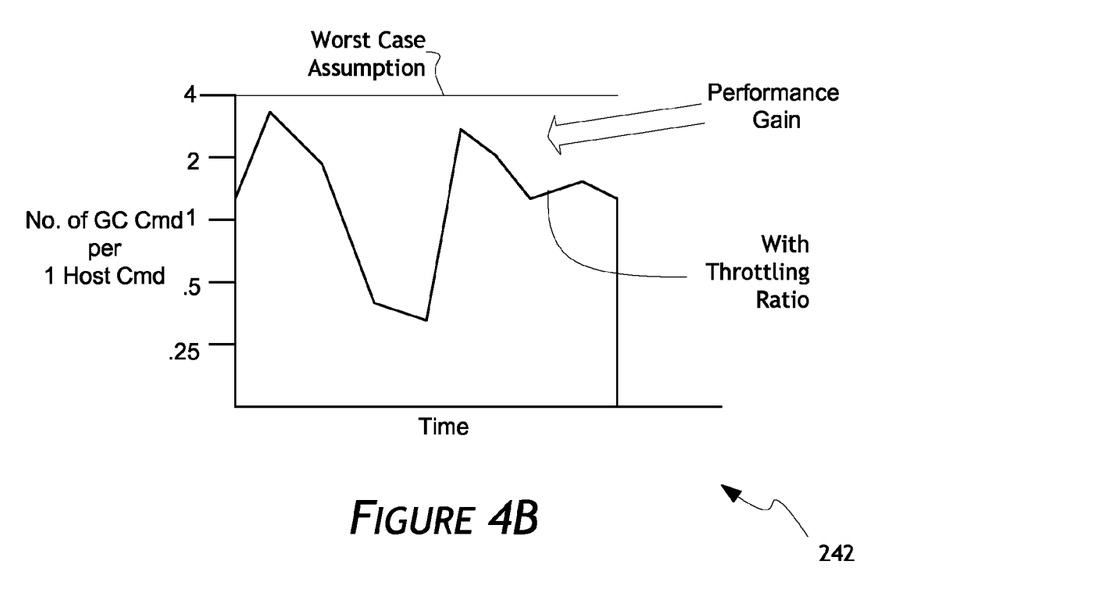

FIGS. 4A and 4B illustrate examples of managing memory commands according to one embodiment. FIG. 4A shows a table 240 that illustrates an example set of throttling ratios based the percentages of invalid (or valid) pages within a target block that is due to be garbage collected. In the table 240, the first row indicates that if an example target block has 25% pages with invalid data (and hence 75% pages with valid data to be copied and preserved), then the throttling ratio is three garbage collection commands to one host command. The example 3:1 ratio is based on the fact that for every one page containing invalid data that will be freed as a result of garbage collection, three pages of valid data would have to be copied. With reference to FIG. 1B, the queue management logic 144 and/or the controller 150 would execute commands from the queue 142 in the ratio of three garbage collection commands to one host command. In the embodiment shown in FIG. 2, where there are two queues 156 and 158, the controller 150 would execute three commands from the garbage collection command queue 158 for every one command from the host command queue 156. The other rows in the table 240 show other possible throttling ratios based on different percentages of invalid data in the target block. The last row shows that if the target block contains 100% invalid data, no garbage collection commands would be needed since no data in the block would need to be preserved. Thus the queue management logic 144 and/or the controller 150 would be free to execute host commands without a throttling ratio.

In one embodiment, the throttling ratio is calculated by dividing the number of invalid pages in a block selected for garbage collection by the number of total pages in the block. In one embodiment, the quotient of the division is rounded up to a nearest pre-set ratio. For example, a quotient of 0.18 may be rounded to 0.2, which is translated into a pre-set ratio of four garbage collection commands to one host command. In other embodiments, the ratio may be two integers greater than one such as 3:2, 5:2, 7:3, etc. and the number of garbage collection commands in the ratio may be smaller than the number of host commands (e.g. 2:3, 1:5, 1:4, etc.). In other embodiments, the host system may issue a command to temporarily or permanently override the throttling ratio determined by the garbage collection module. Additionally, the throttling ratio may be adjusted based on other monitored conditions of the storage subsystem such observed wear level, erase counts, temperature, and/or voltage spikes.

FIG. 4B shows a graph 242 that illustrates a potential performance gain from one embodiment of the invention. The example graph 242 compares the performance of a hypothetical controller configured to apply the worst case assumption 4:1 throttling ratio (four garbage collection commands per one host command) to one that dynamically adjusting the throttling ratio as described above. As shown, the controller that utilizes the throttling ratio executes garbage collection commands in a range of fewer than four per one host command. The net result is that proportionally more host commands are executed in the same time period.

Command Execution Examples

Figure 5:
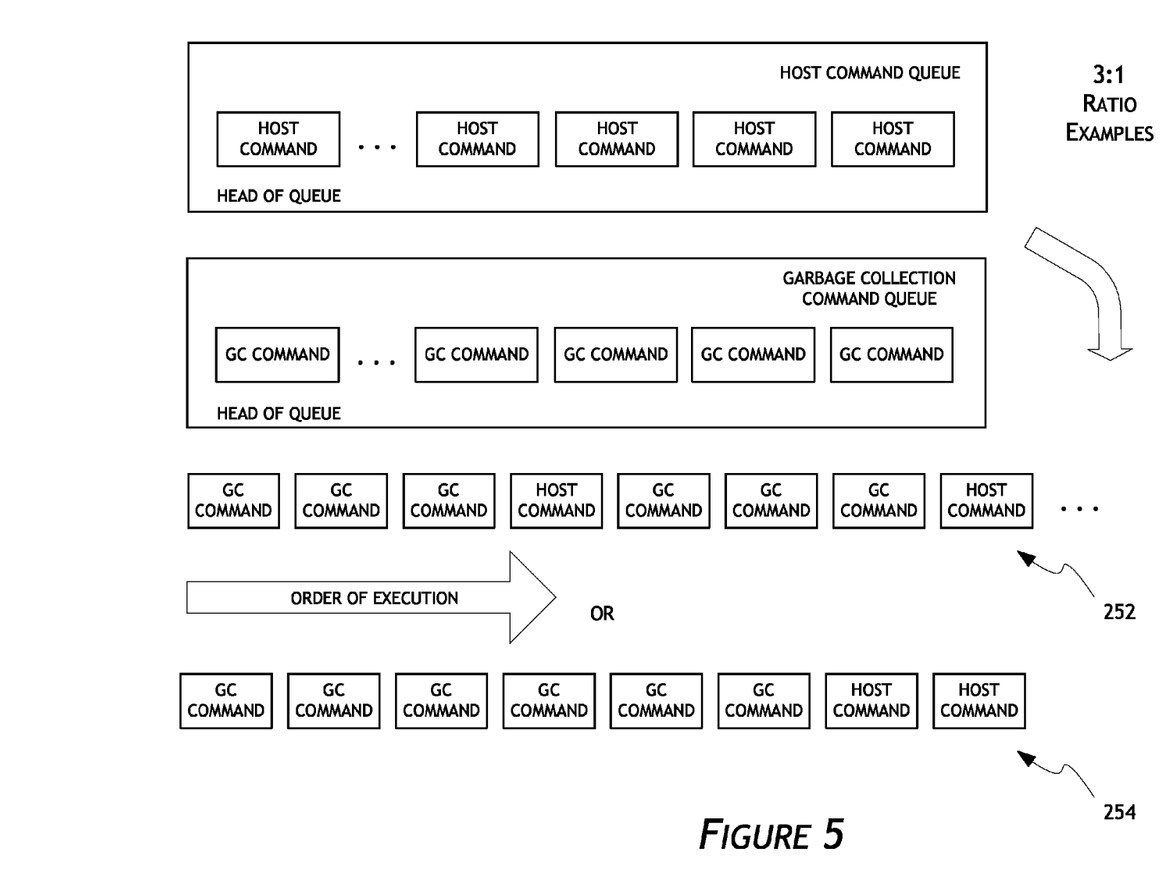
FIG. 5 is a block diagram illustrating an example of executing memory commands according to one embodiment.

FIG. 5 is a block diagram illustrating an example of executing memory commands when a controller (or a queue management logic) is operating under a throttling ratio of 3:1 (three garbage commands to one host command). Although two queues are shown, the same selection method can be applied to embodiments where commands are stored in one queue. As shown in example execution order 252, in accordance with the 3:1 ratio the controller executes three garbage collection commands, then a host command, and then three more garbage collection commands followed by another host command. Alternatively, example execution order 254 shows a different execution order in which six garbage commands are executed first and are followed by two host commands. This variation illustrates the flexibility the controller has in various embodiments to schedule host commands within the confine of the throttling ratio. In this 3:1 ratio example, the host commands can be executed in any order as long they are (1) executed in the order in which they were received from host system, and (2) executed in a time frame in which their execution is offset by a number of garbage collection commands that satisfies the throttling ratio. Thus, as a variation to example execution order 254, the controller may choose to execute the two host commands first and then execute the six garbage collection commands. In one embodiment, a garbage collection command as shown includes two commands, a read command to read data at a valid page address within the block undergoing garbage collection, and a write command to write the data read from the valid page address to a new location in memory. In one embodiment, the host command as shown is a host write command.

Figure 6:
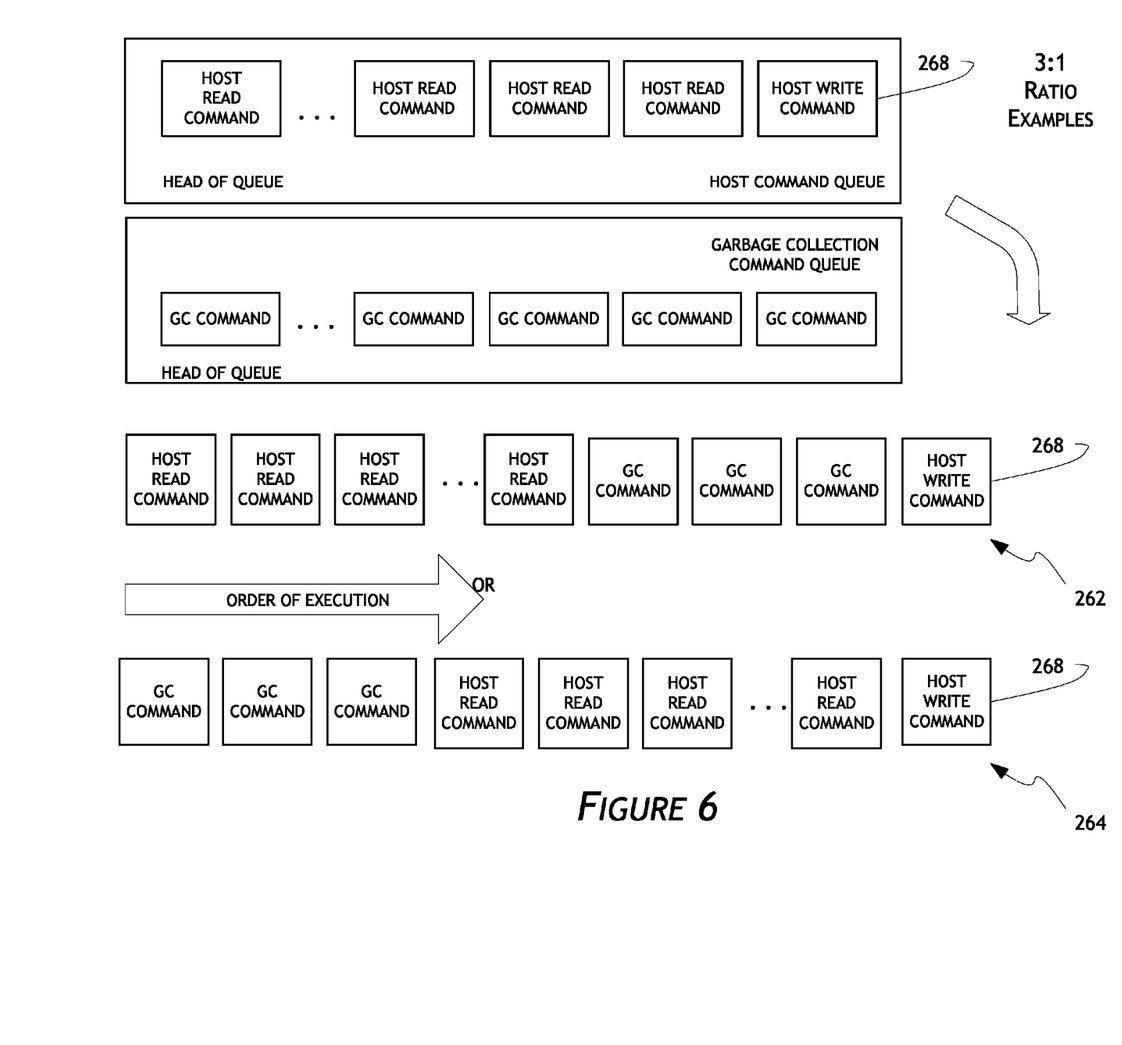
FIG. 6 is a block diagram illustrating an example of executing memory commands according to one embodiment.

FIG. 6 illustrates an alternative embodiment in which the controller (or the queue management logic) distinguishes between the types of memory commands received the host system. As with FIG. 5, although two queues are shown, the same selection method can be applied to embodiments where commands are stored in one queue. The host command queue is shown to include both read and write commands. In this embodiment, the controller can execute as many read commands as needed without regard to the throttling ratio, as long as the read commands are executed in the same order received with respect to other read and write commands. As shown in FIG. 6, the host command queue has a number of host read commands followed by a host write command 268. Example execution order 262 shows the controller executing a number host read commands received from the host system, then three garbage collection commands, and finally the host write command 268. The 3:1 throttling ratio here concerns the host write commands and the garbage collection commands and not the host read commands. Thus five or 10 or more host read commands can be executed as long as the host write commands and garbage collection commands conform to the throttling ratio. Alternatively, example execution order 264 shows the controller executing three garbage collection commands, a number of host read commands, and the host write command 268. Again, the throttling ratio applies to the garbage collection and host write commands and does not limit the number of the host read commands that can be executed within the same time frame. In both example execution orders, the host write command 268 is executed after the host read commands, in the same order in which they were received in the queue, to preserve data integrity. As with FIG. 5, in one embodiment, a garbage collection command as shown includes two commands, a read command to read data at a valid page address within the block undergoing garbage collection, and a write command to write the data read from the valid page address to a new location in memory.

CONCLUSION

The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A storage subsystem, comprising:
a non-volatile solid-state memory array; and
a controller comprising:
  a system operation module configured to manage system memory operations; and
  a queue configured to receive memory commands from a host system and the system operation module,
the controller configured to execute, in the memory array, memory commands from the queue in a sequence based at least in part on a throttling ratio provided by the system operation module by initiating execution of write memory commands and garbage collection commands at a ratio corresponding to the throttling ratio, wherein the memory commands from the host system comprise read memory commands and the write memory commands, and wherein the read memory commands are executed without regard to the throttling ratio.

2. The storage subsystem of claim 1, wherein the system operation module comprises a garbage collection module.

3. The storage subsystem of claim 2, wherein the throttling ratio is based at least in part on a percentage of invalid pages in a current block selected by the garbage collection module for a garbage collection memory operation.

4. The storage subsystem of claim 2, wherein the throttling ratio is calculated by dividing the number of valid pages by the number of invalid pages in a current block selected by the garbage collection module for a garbage collection memory operation.

5. The storage subsystem of claim 2, wherein the controller is configured to execute the memory commands from the host system and the garbage collection module in a sequence that depends on the throttling ratio.

6. The storage subsystem of claim 1, wherein the queue comprises a first queue configured to receive memory commands from the host system and a second queue configured to receive memory commands from the system operation module.

7. The storage subsystem of claim 6, wherein the throttling ratio comprises a number and the controller is further configured to execute, for each command in the first queue, at least a number of memory commands in the second queue specified by the number.

8. The storage subsystem of claim 1, wherein the throttling ratio comprises a first number and a second number and the controller is further configured to execute a number of memory commands from the system operation module specified by the first number for every number of memory commands from the host system specified by the second number.

9. A method of managing memory operations in non-volatile solid-state memory:
selecting a target block for a system operation;
determining a throttling ratio;
providing one or more commands for the system operation to a queue associated with a controller for the non-volatile solid-state memory; and
executing from the queue the one or more system operation commands and one or more commands received from a host system in a sequence based at least in part on the throttling ratio by initiating execution of write commands and the one or more system operation commands at a ratio corresponding to the throttling ratio, wherein the one or more commands received from the host system comprise read commands and the write commands, and wherein the read commands are executed without regard to the throttling ratio.

10. The method of claim 9, wherein the system operation comprises a garbage collection operation.

11. The method of claim 10, wherein the queue comprises a first queue configured to receive the commands from the host system and a second queue configured to receive the commands for the garbage collection operation.

12. The method of claim 10, wherein the determining a throttling ratio comprises calculating the throttling ratio based on the percentage of invalid pages in the target block.

13. The method of claim 10, wherein the determining a throttling ratio comprises dividing the number of valid pages by the number of invalid pages in the target block.

14. The method of claim 10, wherein the executing comprises:
executing, for each command received from the host system, at least a number of the commands for the garbage collection operation specified by the throttling ratio.

15. The method of claim 9, wherein the throttling ratio comprises a first and a second numbers and the executing comprises:
executing a number of the system operation commands specified by the first number for every number of the commands received from the host system specified by the second number.

* * * * *